United States Patent [19]

Cooper et al.

[11] Patent Number: 4,782,938
[45] Date of Patent: Nov. 8, 1988

[54] HYDRAULIC AND ELECTRICAL SYSTEM FOR AIRCRAFT BELT LOADER

[75] Inventors: Robert R. Cooper, Orlando; William C. Dean, Orange City, both of Fla.

[73] Assignee: FMC Corporation, Chicago, Ill.

[21] Appl. No.: 18,791

[22] Filed: Feb. 24, 1987

Related U.S. Application Data

[63] Continuation of Ser. No. 871,169, Jun. 3, 1986, abandoned, which is a continuation of Ser. No. 586,524, Mar. 5, 1984, abandoned.

[51] Int. Cl.⁴ .............................................. B65G 67/00
[52] U.S. Cl. .................................. 198/301; 198/316.1; 180/53.5; 180/65.8; 180/273; 414/347; 414/495
[58] Field of Search ................................ 198/301–320; 60/423, 431, 911; 307/9–10 BP, 130; 361/92; 180/65.1, 65.8, 53.5, 271, 273; 414/345, 346, 347, 495, 528

[56] References Cited

U.S. PATENT DOCUMENTS

| | | | |
|---|---|---|---|
| 3,184,045 | 5/1965 | Fry | 198/316 |
| 3,354,789 | 11/1967 | Schenkelberger | 60/911 X |
| 3,698,187 | 10/1972 | Logan | 60/911 X |
| 3,720,332 | 3/1973 | Molby | 60/911 X |
| 3,952,509 | 4/1976 | Coleman | 60/911 X |
| 4,039,903 | 8/1977 | Russell | 307/10 BP X |
| 4,055,047 | 10/1977 | Hara | 60/911 X |
| 4,144,946 | 3/1979 | Melocik | 60/911 X |
| 4,164,121 | 8/1979 | Houseman et al. | 60/911 X |
| 4,184,333 | 1/1980 | Blaha et al. | 60/911 X |
| 4,215,543 | 8/1980 | Miller | 60/911 X |
| 4,270,057 | 5/1981 | Holt | 307/10 BP |
| 4,312,619 | 1/1982 | Anderson et al. | 414/347 |
| 4,334,408 | 6/1982 | LaPointe | 60/423 |
| 4,381,731 | 5/1983 | Dill | 60/911 X |
| 4,485,623 | 12/1984 | Chichester et al. | 60/423 X |
| 4,493,001 | 1/1985 | Sheldrake | 307/10 BP X |
| 4,690,606 | 9/1987 | Ross | 414/495 |

FOREIGN PATENT DOCUMENTS 1385099 2/1975 United Kingdom ................. 60/911

Primary Examiner—Robert J. Spar
Assistant Examiner—Lyle Kimms
Attorney, Agent, or Firm—Ronald C. Kamp; Richard B. Megley

[57] ABSTRACT

This invention relates generally to hydraulic and electrical systems for aircraft belt loaders and more particularly to such systems with interlocks to facilitate efficient and safe operation. The present invention provides a hydraulic and electrical system for battery powered aircraft belt loaders which precludes actuation of the electric traction drive motors when the brake is applied or set, or without the operator seat being occupied, which precludes actuation of the belt conveyor if the brake is not set, which controls conveyor run time and requires that the conveyor be reset to neutral before being actuated the hydraulic pump to permit power steering when the operator seat is occupied, and which requires that the directional control lever for traction drive be reset to neutral after demounting the seat before the electric traction drive motors can be energized.

4 Claims, 2 Drawing Sheets

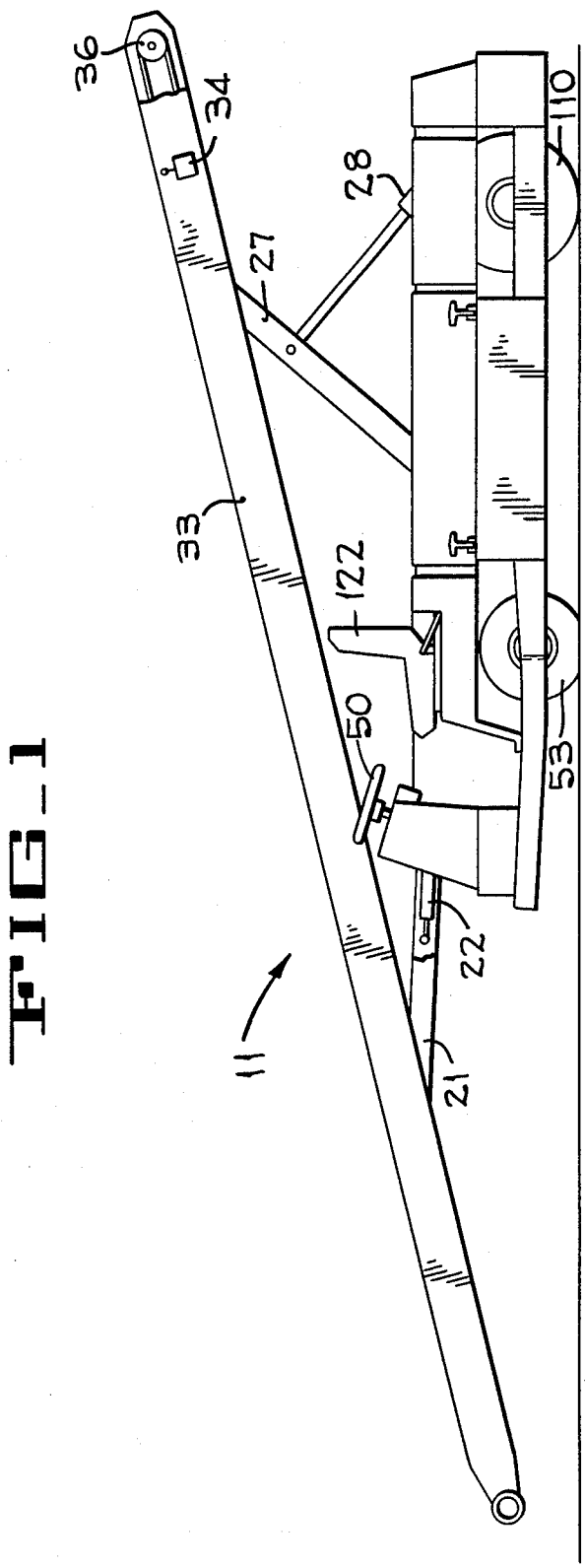
FIG_1

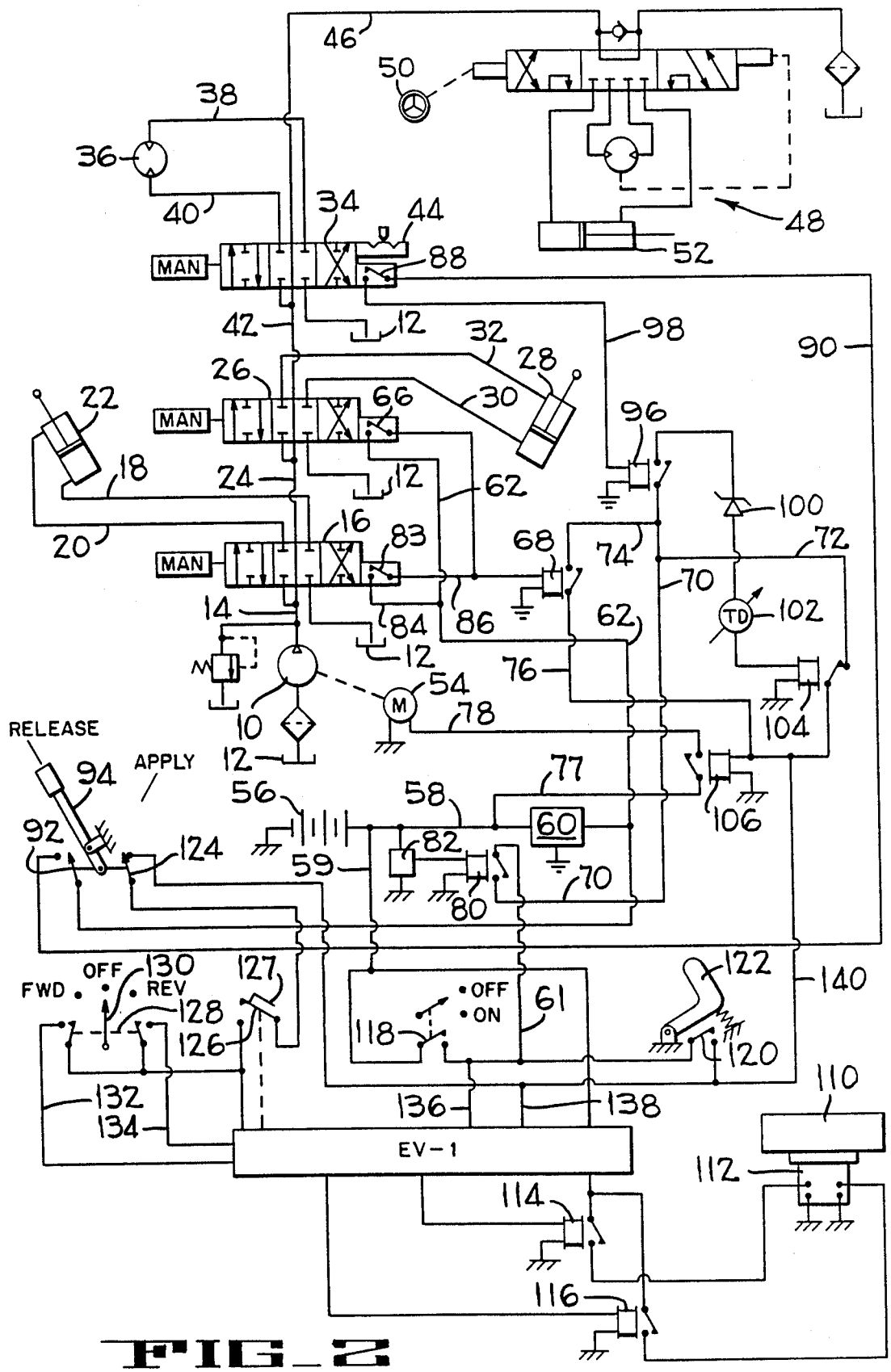
FIG_2

HYDRAULIC AND ELECTRICAL SYSTEM FOR AIRCRAFT BELT LOADER

This application is a continuation of application Ser. No. 871,169, filed June 3, 1986, now abandoned, which, in turn, was a continuation of application Ser. No. 586,524, filed Mar. 5, 1984, now abandoned.

This invention relates generally to hydraulic and electrical systems for aircraft belt loaders and more particularly to such systems with interlocks to facilitate efficient and safe operation.

The present invention provides a hydraulic and electrical system for battery powered aircraft belt loaders which precludes actuation of the electric traction drive motors when the brake is applied or set, or without the operator seat being occupied, which precludes actuation of the belt conveyor if the brake is not set, which controls conveyor run time and requires that the conveyor be reset to neutral before being actuated after its timed run has been completed, which actuates the hydraulic pump to permit power steering when the operator seat is occupied, and which requires that the directional control lever for traction drive be reset to neutral after demounting the seat before the electric traction drive motors can be energized. Other advantages and desirable attributes of the present invention will become apparent from a perusal of the following description and the accompanying drawing, wherein the FIG. 2 shows a hydraulic and electric schematic of a system according to the present invention.

Briefly described, FIG. 1 is a side elevational view of a belt loader incorporating the present invention and FIG. 2 is a hydraulic and electrical schematic of a preferred embodiment of the present invention.

Referring to the drawings, the hydraulic system includes a pump 10 which draws hydraulic fluid from a reservoir 12 and discharges fluid under pressure into supply conduit 14 which connects with a directional control valve 16. A pair of conduits 18 and 20 connect the head and rod ends of hydraulic cylinder 22 with the valve 16. Shifting the valve 16 to the right will direct fluid pressure to conduit 20 causing the cylinder 22 to contract; the conduit 18 being connected with the reservoir 12. Shifting the valve 16 to the left will connect conduit 18 with pump pressure causing the cylinder 22 to extend; the conduit 20 being connected with reservoir 12. A conduit 24 interconnects the flow-through parts of valve 16 and a valve 26, which valve is connected with the head and rod ends of hydraulic cylinder 28 by conduits 30 and 32. Shifting the valve 26 left and right will cause this cylinder 28 to respectively extend and contract by connecting the conduit 30 with pump pressure for extension and conduit 28 with pump pressure for retraction; the other conduit in each case being connected with the reservoir 12. The cylinders 22 and 28 are connected to front and rear links 21 and 27 respectively mounting a belt conveyor 33 on the chasis of an aircraft belt loader, generally indicated at 11, and extend to raise and contract to lower the associated end of the conveyor.

A third valve 34 is connected with a reversible hydraulic motor 36 by conduits 38 and 40. A conduit 42 interconnects the flow-through ports of valve 26 and 34. Shifting the valve 34 left and right from its center neutral position will cause the motor 36 to be selectively driven in each direction. A detent mechanism 44 holds the valve 34 in each of its shifted positions. The motor 36 is connected to drive the belt conveyor on the aircraft belt loader. A conduit 46 connects the flow-through port of valve 34 with a hydrostatic steering circuit, indicated generally at 48, which is conventional and may be the steering system sold by Eaton Fluid Power Products as their Char-Lynn open center system, non-load reaction circuit. The output of the steering circuit is controlled by a steering wheel 50 and is directed to a steering cylinder 52 mechanically connected to control the angular orientation of the steerable ground-engaging wheels, one of which is shown at 53, on the aircraft belt loader.

An electric motor 54 is mechanically connected to drive the hydraulic pump 10 and is powered by a 72 volt battery 56. The actual connection of the battery 56 to the motor 54 is controlled by a plurality of interlocks, as is the electric traction drive motors, to be described hereinafter. The battery 56 is connected by conductor 58 to a voltage reducer 60 which provides 12 volts for certain control relays and switches. A branch conductor 59 connects the battery 56 to the master or key switch 118 which is connected by conductor 61 to the contacts of relay 80. The relay 80 is energized by voltage monitor device 82 which holds the contacts of relay 80 closed until the voltage of battery 56 drops below a predetermined level. The opening of the contacts on relay 80 at the predetermined low voltage level disables the conveyor motor control in a manner to be described hereinafter. Conductor 70 connects the contacts of relay 80 with the contacts of relay 96 and with the contacts of relay 68 through branch conductor 74 and to the contacts of relay 104 through the branch conductor 72. The output from the reducer 60 is connected by conductor 62 to a normally open switch 66 associated with the valve 26. Switch 66 is closed when valve 26 is shifted in either direction from its center neutral position which energizes relay 68 closing its contacts. Control relay 106 is thereby energized through conductor 76 closing its contacts which connects conductor 77 branching from conductor 58 to conductor 78. The motor 54 will therefore be energized and the hydraulic pump 10 is driven thereby. Switch 83 on valve 16 is closed when this valve is shifted from its neutral position. Conductors 84 and 86 connect switch 83 in parallel with switch 66 so that relay 68 is energized whenever either of the valves 16 and 26 are shifted. The contacts of relay 68 are closed to thereby energize control relay 106 to close its contacts and complete the electric circuit between the battery 56 and the motor 54.

A similar switch 88 is associated with valve 34 and is connected in series through conductor 90 with a switch 92, which switch is closed when the parking brake, indicated by handle 94, is applied. When both switches 92 and 88 are closed, the relay 96 is energized, through conductor 98, closing the contacts of this relay. A zeneer diode 100 drops the voltage to 48 volts which is fed to a conventional solid state time delay 102. The output of time delay 102 is connected with relay 104, which has normally closed contacts. When the time delay 104 has timed out, the relay 104 is energized opening its contacts and breaking the circuit to the control relay 106. Closing the contacts of relay 106 will provide electric power to the motor 54 as described previously. Thus, regardless of the shifted position of valve 34, which is retained in its shifted position by detent 44, the motor 54 will be deenergized when time delay 104 has timed out. Since relay 96 must be deenergized to restart the time delay 102, the valve 34 must be physically returned to neutral position to open the contacts of relay 96 before the conveyor motor 36 can be operated after time delay 102 has timed out. This minimizes the possibility of the belt conveyor being driven in an unintended direction. Also, the contacts of relay 96 are in series with the contacts of relay 80, which relay is controlled by the voltage moniter device 82. Thus relay 96 cannot be energized if the voltage in battery 56 has fallen below a predetermine level. Any attempt to run the conveyor hydraulic motor 36 by actuation of valve 34 under low voltage conditions would alert an operator that the loader must be returned to a charging station for recharging of battery 56.

The two drive wheels, one of which is shown at 110, of the loader are driven by separate electric motors, one of which is shown at 112, connected in parallel. Traction drive in the forward direction is controlled by relay 114 and in the reverse direction by relay 116. The voltage applied is varied by controller EV-1. The speed control of the motors is in reality more complex than illustrated here, but reference may be made to published manuals of General Electric Company regarding that company's electric vehicle controller referred to as EV-1 for more detail information. One of the control signals to EV-1 is generated by a series connection of the key switch 118, the seat switch 120 which is closed when seat 122 is occupied, a switch 124 which is closed when the parking brake is released, and a switch 126 which is closed when the foot accelerator 127 is initially depressed. Power cannot be directed to the electric motor 112 if the parking brake is applied, which preserves battery power, or if the seat is not occupied. A double pole, single throw switch 128 is associated with the directional control lever 130 and provides control signals to EV-1 through conductors 132 and 134. Similarly control signals have provided to EV-1 upon closing the key switch 118 through conductor 136 and upon closing the seat switch 120 through conductor 138. The controller EV-1 will not actuate relays 114 and 116 if a signal arrives, or is present from either of the conductors 132 and 134 before a signal arrives either from the key switch 118 through conductor 136 or from the seat switch 120 through conductor 138. This arrangement requires the lever 130 be returned to neutral after the seat has been demounted and reoccupied before traction drive can be initiated.

In order to provide pump pressure for steering in any circumstance, a conductor 140 is connected from the seat switch 120 to energize control relay 106 and thereby provide electric power to motor 54. The hydraulic pump 10 will, therefore, be driven whenever the seat 122 is occupied. Thus, hydraulic power is available for actuation of steering cylinder 52 in response to rotation of the steering wheel 50.

While a preferred embodiment of the present invention has been illustrated and described herein, various modifications and changes may be made therein without departing from the spirit of the invention as defined by the scope of the appended claims.

What is claimed is:

1. In an aircraft belt loader having an operator seat, a parking brake, battery capable of being recharged, a belt conveyor driven by a hydraulic motor, a hydraulic pump driven by an electric pump motor and ground-engaging wheels driven by an electric traction motor, the improvement comprising:

conveyor valve means moveable from a neutral position for connecting said pump to said hydraulic motor;

first means responsive to movement of said conveyor valve means from neutral for connecting said battery to said electric pump motor;

a traction drive lever moveable to connect said battery with said electric traction motor;

detector means for detecting when the charge in said battery falls below a predetermined level;

disabling means responsive to said detector means for disabling the connection between said battery and said electric pump motor while permitting connection between said battery and said electric traction motor when the battery charge falls below said predetermined level;

seat occupied means for preventing connection of said battery with said electric traction motor while permitting connection of said electric pump motor to said battery when said seat is unoccupied; and brake set means for permitting operation of said traction drive motor only when said parking brake is released and of said conveyor only when said parking brake is applied.

2. The invention according to claim 1, and further comprising:

detent means for holding said conveyor valve means when it is moved from its neutral position; and timer means responsive to movement of said conveyor valve means from neutral and interposed in said first means to interrupt the connection between said battery and said electric pump motor when a predetermined time has elasped, whereby said battery will not be discharged by inadvertent operation of the belt conveyor when the said loader is unattended.

3. The invention according to claim 2, wherein said timer means includes a reset means requiring that said conveyor valve means be moved to neutral before said timer means can be restarted.

4. The invention according to claim 1 and further comprising sequencing means associated with said seat occupied means and said traction drive lever which requires said lever be returned to neutral once the seat has been vacated before the connection between said battery and said traction drive motor may be made, whereby the possibility of an operator inadvertently driving the loader into an aircraft is minimized.

* * * * *